United States Patent
Takeda et al.

(10) Patent No.: US 11,956,714 B2
(45) Date of Patent: Apr. 9, 2024

(54) USER EQUIPMENT, NETWORK NODE, AND COMMUNICATION SYSTEM

(71) Applicant: NTT DOCOMO, INC., Tokyo (JP)

(72) Inventors: Shinya Takeda, Tokyo (JP); Hiroshi Ishikawa, Tokyo (JP); Maoki Hikosaka, Tokyo (JP); Kenichiro Aoyagi, Tokyo (JP); Atsushi Minokuchi, Tokyo (JP); Ban Al-Bakri, Juan Les Pins (FR)

(73) Assignee: NTT DOCOMO, INC., Tokyo (JP)

( * ) Notice: Subject to any disclaimer, the term of this patent is extended or adjusted under 35 U.S.C. 154(b) by 120 days.

(21) Appl. No.: 17/420,839

(22) PCT Filed: Jan. 8, 2020

(86) PCT No.: PCT/JP2020/000302
§ 371 (c)(1),
(2) Date: Jul. 6, 2021

(87) PCT Pub. No.: WO2020/145300
PCT Pub. Date: Jul. 16, 2020

(65) Prior Publication Data
US 2022/0095212 A1 Mar. 24, 2022

(30) Foreign Application Priority Data
Jan. 9, 2019 (EP) .................................... 19315001

(51) Int. Cl.
*H04W 48/18* (2009.01)
*H04W 8/12* (2009.01)
*H04W 84/04* (2009.01)

(52) U.S. Cl.
CPC ............. *H04W 48/18* (2013.01); *H04W 8/12* (2013.01); *H04W 84/042* (2013.01)

(58) Field of Classification Search
CPC ....... H04W 48/18; H04W 48/20; H04W 8/12; H04W 84/042
See application file for complete search history.

(56) References Cited

U.S. PATENT DOCUMENTS

| 8,830,844 B2 | 9/2014 | Mathias et al. |
| 2004/0192254 A1 | 9/2004 | Choi et al. |

(Continued)

FOREIGN PATENT DOCUMENTS

JP    2011-511491 A    4/2011

OTHER PUBLICATIONS

Office Action issued in the counterpart Chinese Patent Application No. 202080008058.4, dated May 6, 2023 (25 pages).
Office Action issued in the counterpart European Patent Application No. 19315001.8, dated Oct. 4, 2022 (5 pages).
(Continued)

*Primary Examiner* — Wayne H Cai
(74) *Attorney, Agent, or Firm* — Osha Bergman Watanabe & Burton LLP

(57) ABSTRACT

A user equipment includes a receiving unit configured to receive, from a network node in a VPLMN (Visited Public land mobile network), information indicating a PLMN to be prioritized and information indicating a trigger of PLMN selection; and a control unit configured to execute the PLMN selection, based on the information indicating the PLMN to be prioritized and the information indicating the trigger of the PLMN selection.

5 Claims, 9 Drawing Sheets

(56) References Cited

U.S. PATENT DOCUMENTS

| | | | |
|---|---|---|---|
| 2010/0279648 A1 | 11/2010 | Song et al. | |
| 2010/0322216 A1 | 12/2010 | Roger et al. | |
| 2011/0211567 A1 | 9/2011 | Chai et al. | |
| 2013/0329567 A1 | 12/2013 | Mathias et al. | |
| 2016/0127884 A1* | 5/2016 | Kim .................. | H04W 60/04 |
| | | | 455/435.2 |
| 2019/0182655 A1* | 6/2019 | Gupta ................ | H04W 76/27 |

OTHER PUBLICATIONS

Summons to attend Oral Proceedings issued in the counterpart European Patent Application No. 19315001.8, dated Jun. 7, 2023 (7 pages).

International Search Report issued in PCT/JP2020/000302 dated Mar. 24, 2020 (8 pages).

Written Opinion of the International Searching Authority issued in PCT/JP2020/000302 dated Mar. 24, 2020 (5 pages).

Extended European Search Report issued in counterpart European Patent Application No. 19315001.8, dated Jul. 15, 2019 (15 pages).

3GPP TS 23.122 V15.6.0; "3rd Generation Partnership Project; Technical Specification Group Core Network and Terminals; Non-Access-Stratum (NAS) functions related to Mobile Station (MS) in idle mode: (Release 15)"; Dec. 2018 (63 pages).

3GPP TR 23.501 V15.3.0; "3rd Generation Partnership Project; Technical Specification Group Services and System Aspects; System Architecture for the 5G System; Stage 2 (Release 15)"; Sep. 2018 (226 pages).

Office Action issued in counterpart Japanese Patent Application No. 2020-565179 mailed on Jan. 30, 2024 (8 pages).

\* cited by examiner

USER EQUIPMENT, NETWORK NODE, AND COMMUNICATION SYSTEM

TECHNICAL FIELD

The present invention relates to a user equipment, network node, and communication system.

BACKGROUND ART

In 3GPP (3rd Generation Partnership Project), in order to realize a further increase in system capacity, a further increase in the data transmission speed, less delay in a radio section, etc., studies are being made with respect to a radio communication method referred to as 5G or NR (New Radio) (hereinafter, the radio communication method is referred to as "5G" or "NR"). In 5G, various radio technologies are being studied, in order to satisfy the requirement of setting the delay in the radio section to 1 ms or less while realizing a throughput of 10 Gbps or more.

In NR, studies are being made with respect to a network architecture including 5GC (5G Core Network) corresponding to EPC (Evolved Packet Core) that is the core network in the network architecture of LTE (Long Term Evolution), and NG-RAN (Next Generation-Radio Access Network) corresponding to E-UTRAN (Evolved Universal Terrestrial Radio Access Network) that is RAN (Radio Access Network) in the network architecture of LTE (for example, Non-Patent Document 1).

RELATED ART DOCUMENT

Non-Patent Document

Non-Patent Document 1: 3GPP TS 23.501 V15.3.0 (2018-09)

SUMMARY OF THE INVENTION

Problem to be Solved by the Invention

In the NR, when the user equipment is connected to the network in a roaming environment, and SoR (Steering of Roaming) information, which is related to control of selecting the PLMN (Public land mobile network) to be prioritized, is acquired by the user equipment, it has been difficult to control the timing of executing the PLMN selection.

The present invention has been made in view of the above points, and it is an object of the present invention to control the trigger of network selection by a user equipment in a roaming environment.

Means for Solving the Problem

According to the disclosed technology, a user equipment including a receiving unit configured to receive, from a network node in a VPLMN (Visited Public land mobile network), information indicating a PLMN to be prioritized and information indicating a trigger of PLMN selection; and a control unit configured to execute the PLMN selection, based on the information indicating the PLMN to be prioritized and the information indicating the trigger of the PLMN selection, is provided.

Advantage of the Invention

According to the disclosed technology, a trigger of network selection by a user equipment in a roaming environment, can be controlled.

EMBODIMENTS OF THE INVENTION

Embodiments of the present invention will be described below with reference to the drawings. Note that the embodiments described below are merely examples, and embodiments to which the present invention is applied are not limited to the following embodiments.

In operations of a radio communication system according to the embodiment of the present invention, the existing technology is used as appropriate. The existing technology is, for example, existing LTE; however, the existing technology is not limited to existing LTE. Furthermore, the term "LTE" used in the present specification has a wide meaning including LTE-Advanced and LTE-Advanced or beyond (for example, NR), or wireless LAN (Local Area Network), unless otherwise specified.

Furthermore, in the embodiment of the present invention, the radio parameter, etc., being "configured" means that a predetermined value is "pre-configured", or a radio parameter, which is reported from a network node 10 or a user equipment 20, is configured.

Figure 1:
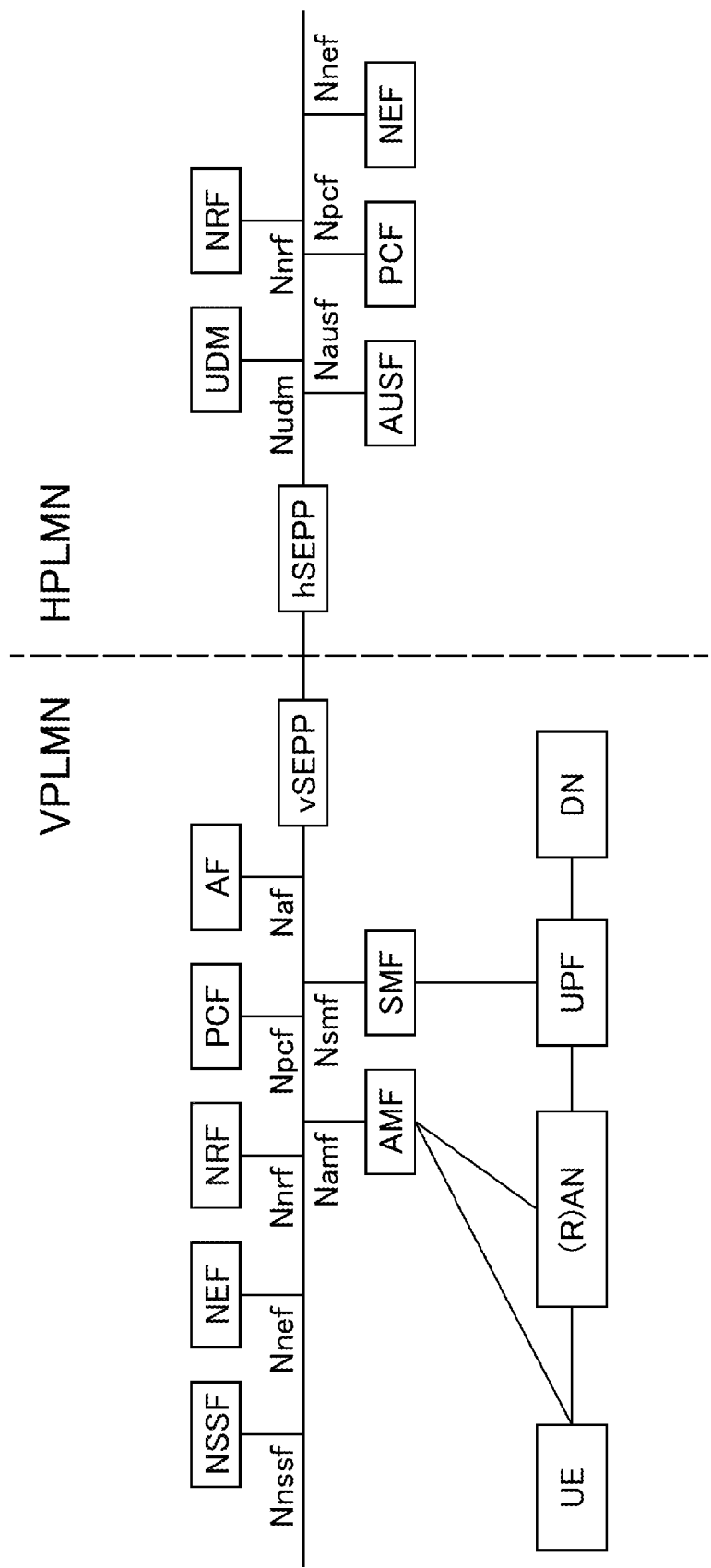
FIG. 1 is a diagram for describing a communication system according to an embodiment of the present invention.

FIG. 1 is a diagram for describing a communication system according to an embodiment of the present invention. As illustrated in FIG. 1, the communication system is formed of a UE, which is the user equipment 20, and a plurality of network nodes 10. Hereinafter, it is assumed that one network node 10 corresponds to each function; however, one network node 10 may implement a plurality of functions, or a plurality of network nodes 10 may implement one function. Furthermore, the "connection" described below may be a logical connection or a physical connection.

The RAN (Radio Access Network) is the network node 10 having a radio access function, and is connected to the UE, the AMF (Access and Mobility Management Function), and the UPF (User Plane Function). The AMF is the network node 10 having functions such as termination of a RAN interface, termination of NAS (Non-Access Stratum), registration management, connection management, reachability management, and mobility management, etc. The UPF is the network node 10 having functions such as a PDU (Protocol Data Unit) session point for external interconnection with a DN (Data Network), packet routing and forwarding, and QoS (Quality of Service) handling of a user plane, etc. The UPF and the DN constitute a network slice. In the radio communication network according to the embodiment of the present invention, a plurality of network slices may be constructed.

The AMF is connected to UE, RAN, SMF (Session Management function), NSSF (Network Slice Selection Function), NEF (Network Exposure Function), NRF (Network Repository Function), AUSF (Authentication Server Function), PCF (Policy Control Function), AF (Application Function), UDM (Unified Data Management), and SEPP (Security Edge Protection Proxy). AMF, SMF, NSSF, NEF, NRF, AUSF, PCF, AF, and UDM are the network nodes 10 that are connected to each other via interfaces based on the respective services, Namf, Nsmf, Nnssf, Nnef, Nnrf, Nausf, Npcf, Naf, and Nudm.

The SMF is the network node 10 having functions such as managing a session, allocating and managing an IP (Internet Protocol) address of the UE, a DHCP (Dynamic Host Configuration Protocol) function, an ARP (Address Resolution Protocol) proxy, and a roaming function, etc. The NEF is the network node 10 having a function of reporting capabilities and events to another NF (Network Function). The NSSF is the network node 10 having functions such as selecting a network slice to which the UE connects, determining permitted NSSAI (Network Slice Selection Assistance Information), determining NSSAI to be configured, and determining an AMF set to which the UE connects. The PCF is the network node 10 having a function of performing network policy control. The AF is the network node 10 having the function of controlling the application server. The UDM is the network node 10 having the functions of generating authentication information, identifying users, and restricting access during roaming based on subscriber data, etc. The SEPP is a nontransparent proxy and filters control plane messages between the PLMNs (Public land mobile network). The vSEPP illustrated in FIG. 1 is the SEPP in a visited network, and the hSEPP is the SEPP in a home network.

As illustrated in FIG. 1, the UE is in a roaming environment connected to the RAN and the AMF in the VPLMN (Visited PLMN). The VPLMN and the HPLMN (Home PLMN) are connected via the vSEPP and the hSEPP. The UE can communicate with the UDM of the HPLMN, for example, via the AMF of the VPLMN.

As illustrated in FIG. 1, the UE is in a roaming environment connected to RAN and AMF in VPLMN (Visited PLMN). The VPLMN and the HPLMN (Home PLMN) are connected via vSEPP and hSEPP. The UE can communicate with the UDM of the HPLMN, for example, via the AMF of the VPLMN.

Figure 2:
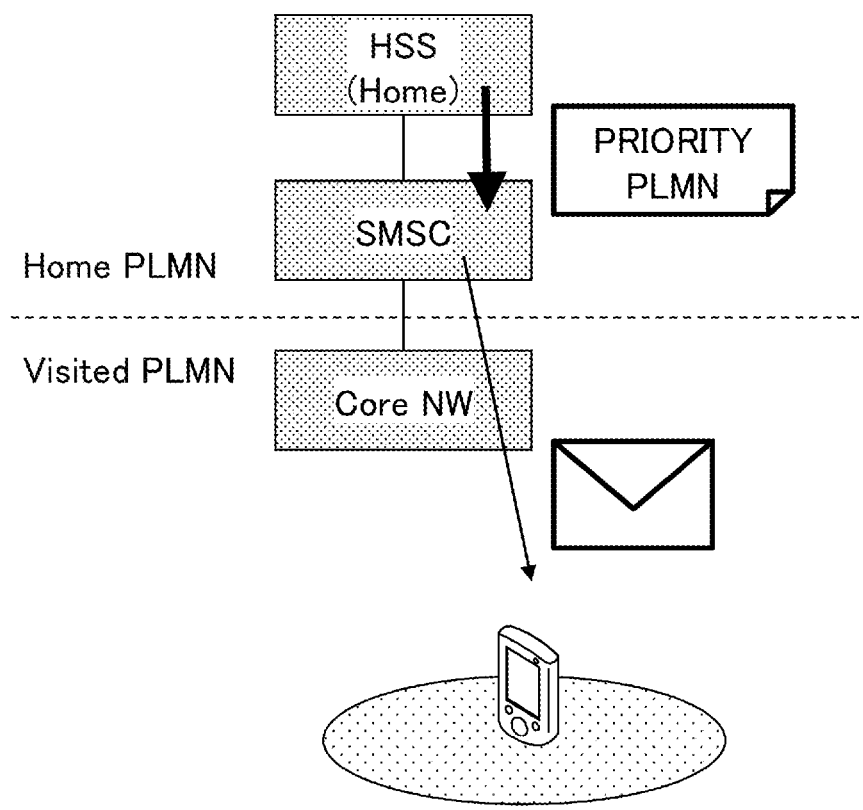
FIG. 2 is a diagram for describing example (1) of a SoR processing method.

FIG. 2 is a diagram for describing example (1) of the SoR processing method. Referring to FIG. 2, a description is given of an SoR (Steering of Roaming) function for instructing PLMN in which a home business operator is located, to a user who is roaming in LTE.

The UE selects the PLMN according to a priority PLMN list (EF_OPLMNwAcT) recorded in the USIM (Universal Subscriber Identity Module). As illustrated in FIG. 2, in SoR, an SMS (Short Message Service) for rewriting the PLMN list of USIM, is transmitted from the HSS (Home Subscriber Server) to the roaming UE, and the UE receives the SMS via the SMSC (SMS Center) and the core network (Core NW), thereby controlling the PLMN in which the UE is to be located with priority.

Figure 3:
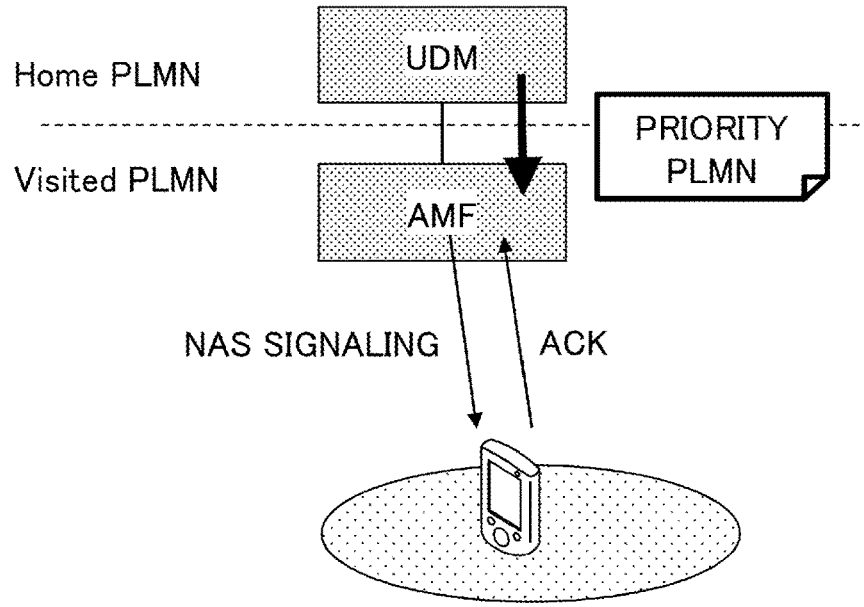
FIG. 3 is a diagram for describing example (2) of a SoR processing method.

FIG. 3 is a diagram for describing example (2) of the SoR processing method. In the SoR processing method illustrated in FIG. 2, the SoR function cannot be provided to a terminal that is not compatible with SMS (a module terminal, for example). Furthermore, a response (ACK) is not returned from the terminal, and, therefore, the network node that is the distribution source cannot recognize that the rewriting is completed.

Therefore, in the HPLMN and the VPLMN of the 5G system as illustrated in FIG. 1, the SoR function is implemented by rewriting the PLMN list of the UE by NAS (Non Access Stratum) signaling. By rewriting the PLMN list by NAS signaling, it becomes possible to control a terminal that is not compatible with SMS, the UE returns a response to the network node that is the distribution source, and the UE can report to the network that the rewriting is normally completed.

As illustrated in FIG. 3, the priority PLMN that is SoR information, is transmitted from the UDM in the HPLMN to the AMF in the VPLMN. Subsequently, the AMF transmits the priority PLMN received from the UDM to the UE via NAS signaling. Upon receiving the priority PLMN, the UE transmits an ACK to the AMF.

Here, when the UE performs the PLMN selection during communication, upon receiving the SoR information, the network search operates, and, therefore, the call being communicated is disconnected. Whether the call is to be disconnected and PLMN selection is to be performed immediately, or whether to wait for the communication to end and then perform PLMN selection, depends on the implementation of the UE. Therefore, it is not possible to start the process of PLMN selection according to the call type being communicated or the policy of the business operator. As an example requiring to start the process of PLMN selection according to the type of call being communicated, when the call type being communicated is a voice call, disconnection will have a large impact on the user and thus should be avoided. Furthermore, for example, when the type of call being communicated is data communication, the call should be disconnected, and the UE should be immediately located in the priority PLMN.

Furthermore, if PLMN selection is performed immediately after an emergency call, the return call from the emergency report receiving organization cannot be received, so it is better to avoid starting PLMN selection immediately after an emergency call.

Thus, the SoR processing method as described below is applied.

Figure 4:
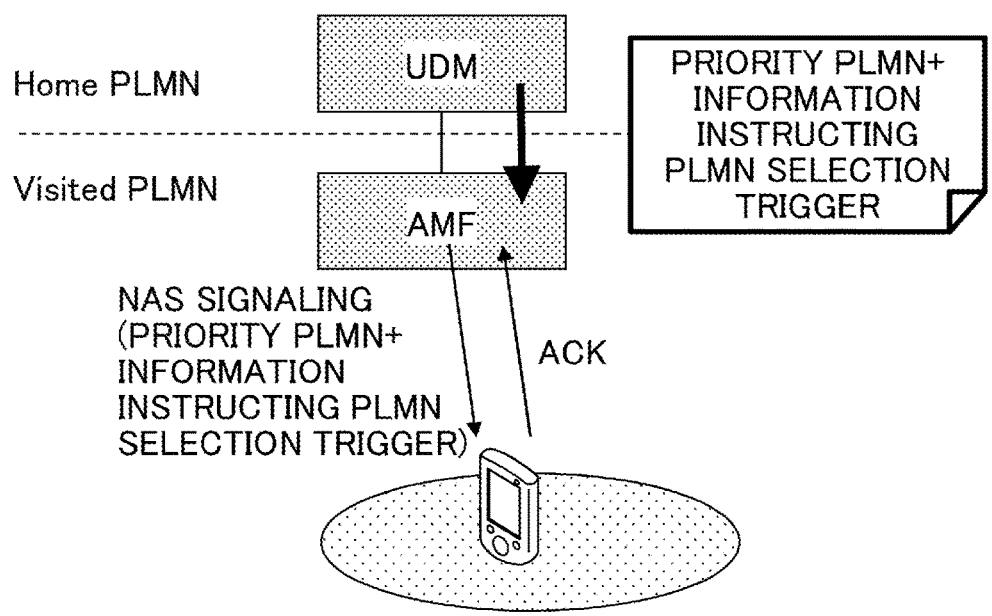
FIG. 4 is a diagram for describing example (1) of a SoR processing method according to the embodiment of the present invention.

FIG. 4 is a diagram for describing example (1) of the SoR processing method according to an embodiment of the present invention. When reporting the priority PLMN list by NAS signaling, the home business operator adds information instructing a trigger of PLMN selection, and the UE performs PLMN selection based on the added information.

As illustrated in FIG. 4, the UDM in the HPLMN transmits, to the AMF in the VPLMN, the priority PLMN that is SoR information and information instructing the PLMN selection trigger. Subsequently, the AMF transmits the priority PLMN and the information instructing the PLMN selection trigger received from the UDM, to the UE via NAS signaling. Upon receiving the priority PLMN and the information instructing the PLMN selection trigger, the UE transmits an ACK to the AMF.

The information instructing the trigger of PLMN selection may be, for example, 1), 2), or 3) below.

1) A timer value. The UE performs the PLMN selection after the expiration of the timer since receiving the SoR information.

2) A flag indicating whether PLMN selection during communication is permitted. When the flag indicates "permit", the UE disconnects the communication and performs the PLMN selection. When the flag indicates "not permitted", the UE waits until the communication is ended, and then performs the PLMN selection after transitioning to an idle state.

3) Configure the timer value of 1) and the flag of 2) for each call type being communicated. Table 1 indicates an example of information and UE operations configured for each call type.

As indicated in Table 1, for the call type "during Internet communication", when the timer value T is configured as 0 sec and the flag is configured as 1, that is, "PLMN selection permitted during communication" is configured, the UE immediately performs PLMN selection upon receiving the SoR information. At this time, when Internet communication is being performed, the communication is disconnected.

Note that only the timer value of 1) may be configured and the flag may not be configured. When communication is being performed at the time of expiration of the timer, the communication may be uniformly disconnected and the PLMN selection may be performed. Furthermore, the UE may wait until transitioning to the idle state and then perform PLMN selection, or the terminal may be configured to determine which operation is to be performed for each call type.

Note that only the flag of 2) may be configured and the timer value may not be configured. Upon receiving the SoR information, the UE immediately performs the PLMN selection, if the UE is not communicating. If the UE is communicating when the SoR information is received, the UE immediately performs PLMN selection or waits until the communication is ended and then performs PLMN selection, based on the flag.

Note that the call type may be other than the call types indicated in Table 1. For example, the call type may be SMS. Also, for example, the call type may be defined for each application of Internet communication. Furthermore, for

TABLE 1

| CALL TYPE | INFORMATION | OPERATION OF TERMINAL |
| --- | --- | --- |
| DURING VOICE CALL (EXCLUDING EMERGENCY CALL) | T = 10 sec<br>Flag = 0 | IF Idle 10 SECONDS LATER, PERFORM PLMN SELECTION.<br>IF DURING VOICE CALL,<br>WAIT UNTIL TRANSITIONING TO Idle STATE. |
| DURING EMERGENCY CALL | T = 60 min<br>Flag = 0 | IF Idle 60 MINUTES LATER, PERFORM PLMN SELECTION.<br>IF DURING EMERGENCY CALL,<br>WAIT UNTIL TRANSITIONING TO Idle STATE. |
| DURING Internet COMMUNICATION | T = 0 sec<br>Flag = 1 | IMMEDIATELY PERFORM PLMN SELECTION.<br>(DISCONNECT IF DURING Internet COMMUNICATION) |

As indicated in Table 1, with respect to the call type "during voice call (excluding emergency call)", when the timer value T is configured as 10 seconds and the flag is configured as 0, that is, "PLMN selection not permitted during communication" is configured, the UE operates as follows. Specifically, if the UE is in an idle state 10 seconds after receiving SoR information, the UE performs PLMN selection. If voice communication is being performed, the UE waits until transitioning to an idle state and then performs the PLMN selection.

As indicated in Table 1, with respect to the call type "during emergency call", when the timer value T is configured as 60 minutes and the flag is configured as 0, that is, "PLMN selection not permitted during communication" is configured, the UE operates as follows. Specifically, if the UE is in an idle state 60 minutes after receiving the SoR information, the UE performs PLMN selection. If an emergency call is being communicated, the UE waits until transitioning to an idle state, and then performs the PLMN selection. Furthermore, as another example, with respect to the call type "during emergency call", when SoR information is received, the UE may activate a timer when the emergency call ends. That is, the UE may perform the PLMN selection if the UE is in the idle state when the timer expires 60 minutes after the end of the emergency call.

example, the call type may be defined for each APN (Access Point Name) or DNN (Data Network Name) of the connection destination.

Figure 5:
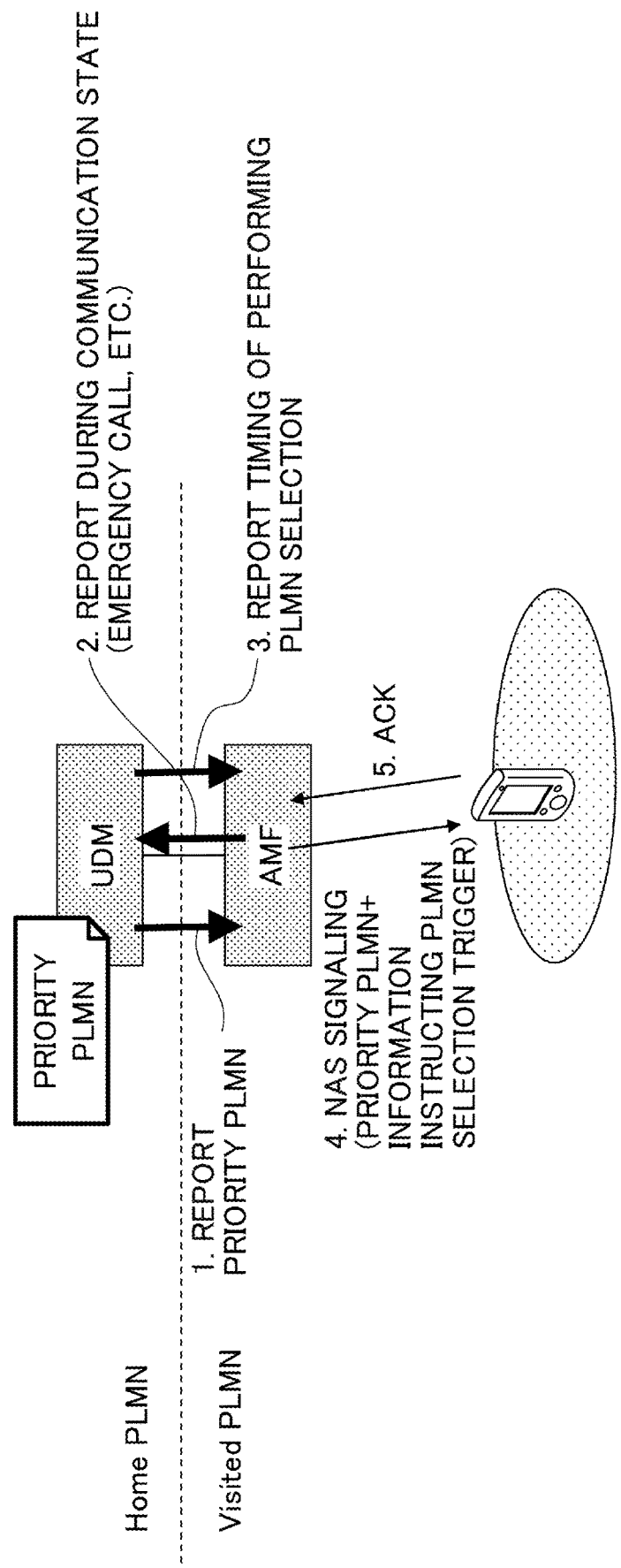
FIG. 5 is a diagram for describing example (2) of a SoR processing method according to the embodiment of the present invention.

FIG. 5 is a diagram for describing example (2) of the SoR processing method according to the embodiment of the present invention. In the example illustrated in FIG. 4, the UE controls the timing of performing the PLMN selection based on the call type being communicated. On the other hand, in the example illustrated in FIG. 5, the network determines the type of call being communicated, and configures the timer value of 1) described above or the flag of 2) described above. The UDM in the HPLMN recognizes the call type, etc., being communicated, and configures an appropriate timer value or a flag indicating whether PLMN selection during communication is permitted.

As illustrated in FIG. 5, in step 1, the UDM in the HPLMN transmits the priority PLMN that is SoR information, to the AMF in the VPLMN. Subsequently, in step 2, the AMF transmits a report related to the state of the communication being performed, to the UDM. Subsequently, in step 3, the UDM determines the timing of performing the PLMN selection based on the received report related to the state of the communication being performed, and transmits a report of the timing of performing the PLMN selection, to the AMF. The report of the timing of performing the PLMN selection corresponds to the information instructing the PLMN selection trigger. Subsequently, in step 4, the AMF transmits, via NAS signaling, the priority PLMN and information instructing the PLMN selection trigger, received from the UDM. Subsequently, in step 5, upon receiving the priority PLMN and the information instructing the PLMN selection trigger, the UE transmits an ACK to the AMF.

Figure 6:
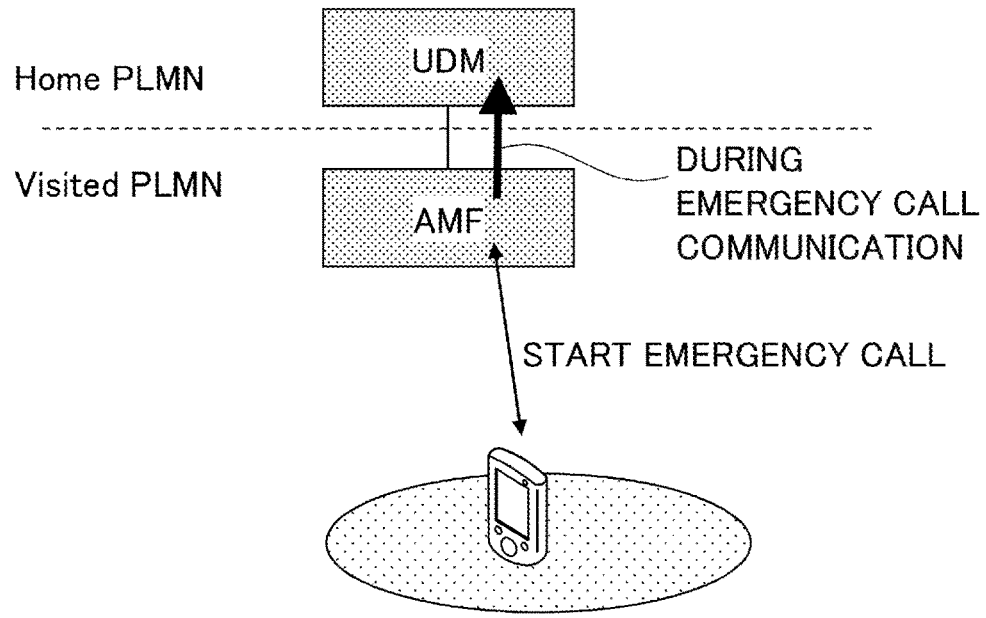
FIG. 6 is a diagram illustrating example (3-1) of an SoR processing method according to an embodiment of the present invention.
Figure 7:
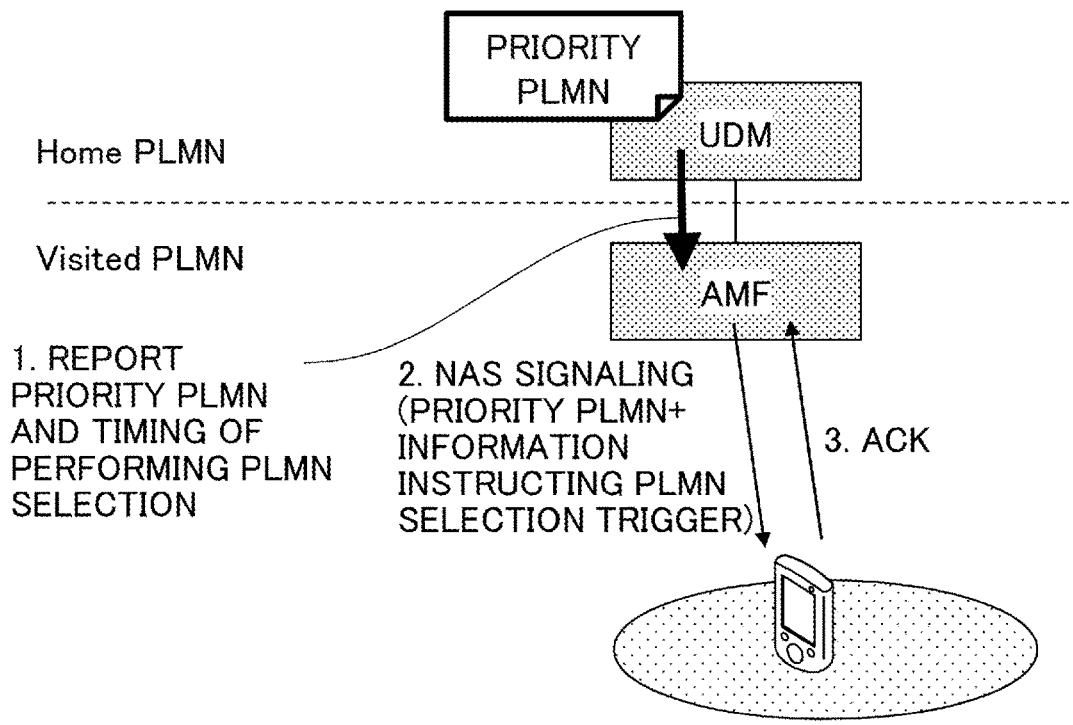
FIG. 7 is a diagram for describing example (3-2) of a SoR processing method according to the embodiment of the present invention.

FIG. 6 is a diagram for describing example (3-1) of the SoR processing method according to the embodiment of the present invention. FIG. 7 is a diagram for describing example (3-2) of the SoR processing method according to the embodiment of the present invention. FIGS. 6 and 7 illustrate examples of reporting, from the AMF in the VPLMN to the UDM in the HPLMN, the state of the communication being performed, each time the state of the communication being performed changes, and of reporting the priority PLMN and the timing of performing the PLMN selection when transmitting the SoR information.

As illustrated in FIG. 6, when the UE starts an emergency call, the AMF in the VPLMN transmits information indicating that the emergency call is being communicated, to the UDM in the HPLMN.

As illustrated in FIG. 7, in step 1, the UDM in the HPLMN transmits, to the AMF in the VPLMN, the priority PLMN that is SoR information and a report of the timing of performing the PLMN selection. As illustrated in FIG. 6, the UDM determines the timing of performing the PLMN selection based on the report related to the state of communication being performed that has already been received. The report of the timing of performing the PLMN selection corresponds to the information instructing the PLMN selection trigger. Subsequently, in step 2, the AMF transmits, to the UE via NAS signaling, the priority PLMN and the information instructing the PLMN selection trigger, received from the UDM. Subsequently, in step 3, upon receiving the priority PLMN and the information instructing the PLMN selection trigger, the UE transmits an ACK to the AMF.

Figure 8:
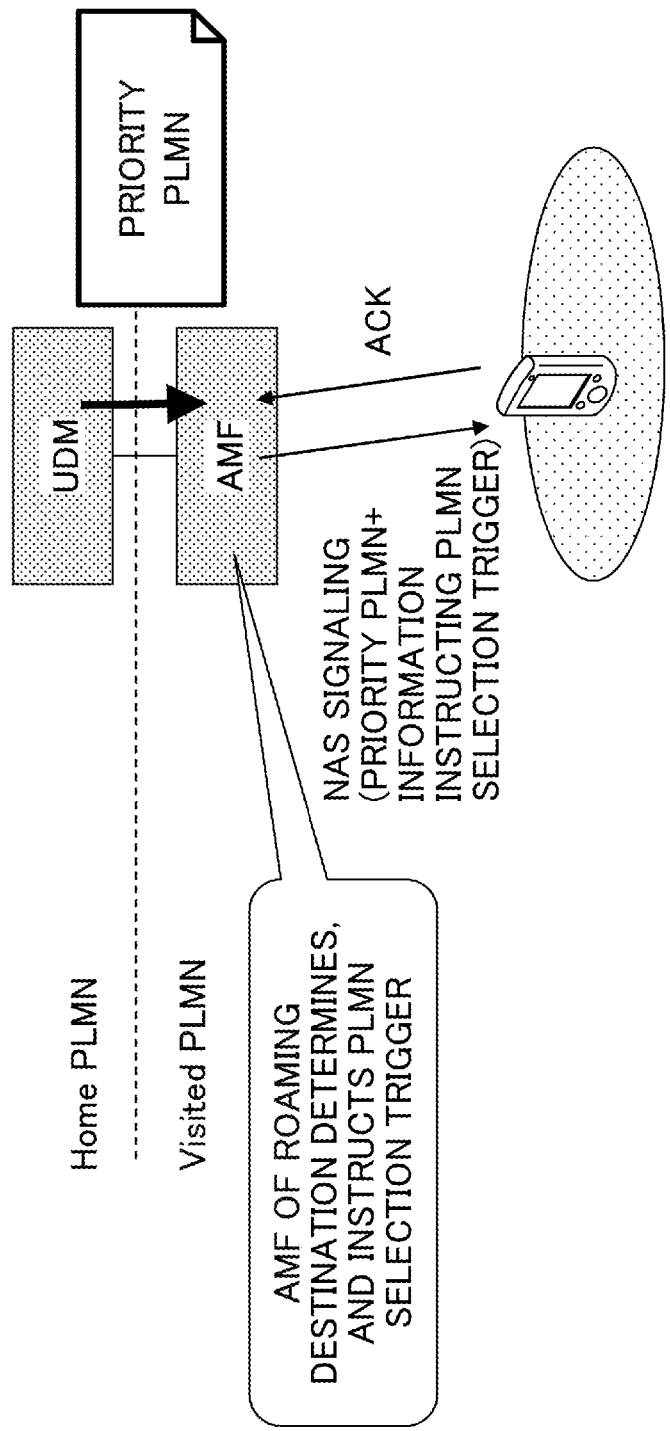
FIG. 8 is a diagram for describing example (4) of a SoR processing method according to the embodiment of the present invention.

FIG. 8 is a diagram for describing example (4) of the SoR processing method according to the embodiment of the present invention. The network determines the type of the call being communicated, and configures the timer value of 1) described above or the flag of 2) described above. The AMF in the VPLMN recognizes the type of call being communicated and configures an appropriate timer value or a flag indicating whether PLMN selection during communication is permitted.

As illustrated in FIG. 8, the AMF in the VPLMN may determine the type of call being communicated, etc., and determine the PLMN selection trigger. The AMF transmits, to the UE via NAS signaling, the priority PLMN and the information instructing the PLMN selection trigger determined by the AMF, received from the UDM. Subsequently, upon receiving the priority PLMN and the information indicating the PLMN selection trigger, the UE transmits an ACK to the AMF.

Figure 9:
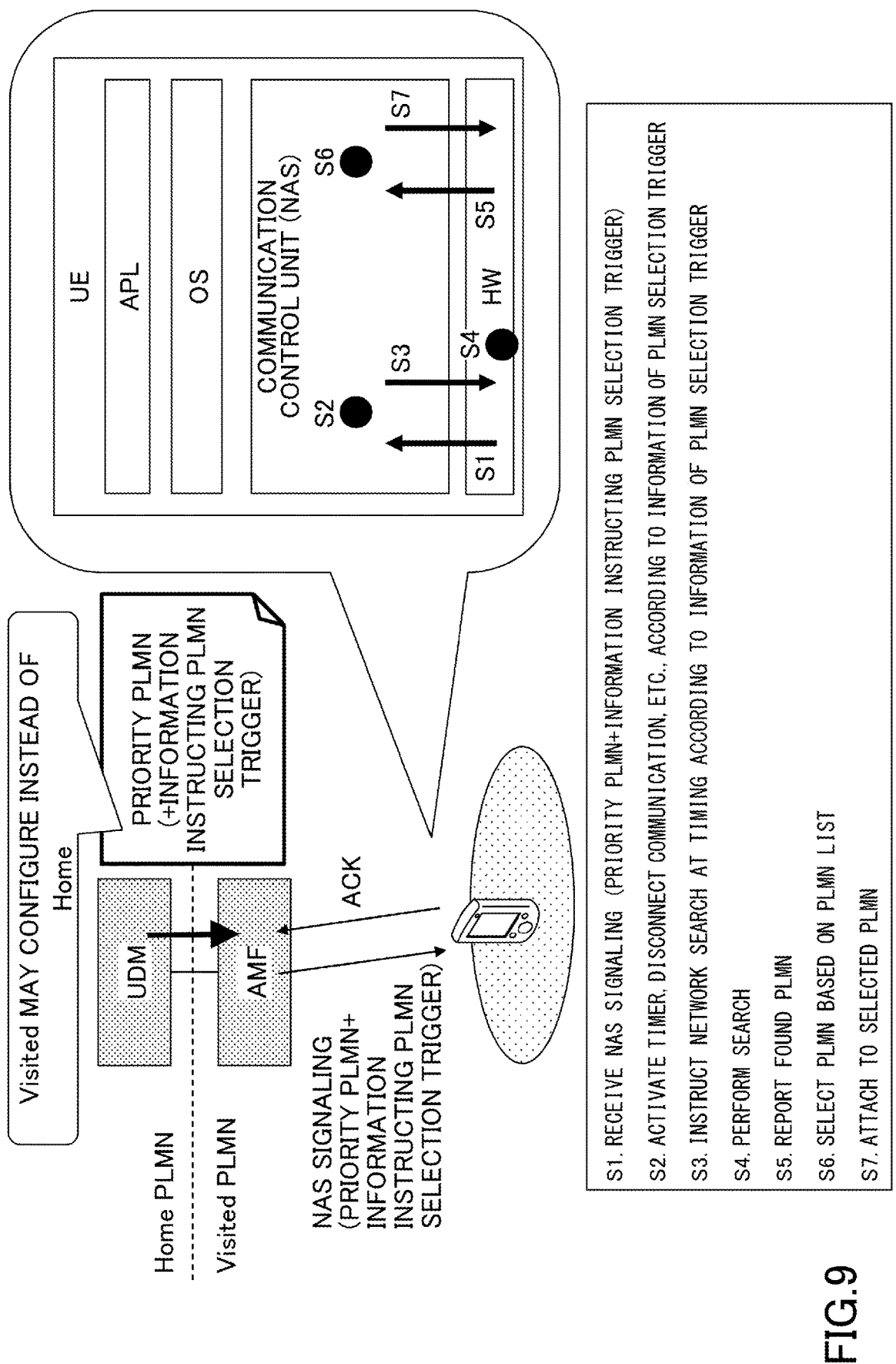
FIG. 9 is a diagram for describing example (5) of a SoR processing method according to the embodiment of the present invention.

FIG. 9 is a diagram for describing example (5) of the SoR processing method according to the embodiment of the present invention. In FIG. 9, the operation as a communication system and processing inside the UE will be described. According to the embodiment of the present invention, a communication system is implemented, in which not only the priority PLMN but also information instructing the PLMN selection trigger, is reported to the UE.

For example, the communication system according to the embodiment of the present invention implements a), b), and c) below.
a) The network reports, to the UE, the information related to the PLMN selection trigger in each communication state, and the UE determines whether to perform the PLMN selection.
b) The AMF in the VPLMN reports the communication state to the UDM in the HPLMN, and the UDM instructs an appropriate PLMN selection trigger to the UE.
c) The roaming destination network, for example, the AMF in VPLMN, instructs an appropriate PLMN selection trigger to the UE, based on the communication state.

Hereinafter, the operation of the functional unit in the UE will be described. The HW (hardware) corresponds to the transmitting unit 210 or the receiving unit 220. The communication control unit, the OS (Operating System), or the APL (Application) corresponds to the control unit 240. In step S1 illustrated in FIG. 9, the HW receives NAS signaling and transmits NAS signaling to the communication control unit. Subsequently, the communication control unit activates the timer, and disconnects the communication, etc., according to the information of the PLMN selection trigger (step S2). Subsequently, the communication control unit transmits a network search instruction to the HW at a timing according to the information of the PLMN selection trigger (step S3). Subsequently, the HW performs a search (step S4). Subsequently, the HW reports the found PLMN to the communication control unit (step S5). Subsequently, the communication control unit performs PLMN selection based on the PLMN list (step S6). Subsequently, the communication control unit transmits, to the HW, an instruction to be attached to the selected PLMN (step S7).

According to the embodiment described above, the AMF that is a network node, can report, to the UE, the information related to the PLMN selection trigger, and can control the PLMN selection trigger for the UE. Furthermore, the AMF reports the communication state of the UE to the UDM that is a network node, so that the UDM can determine an appropriate PLMN selection trigger. Furthermore, the AMF can determine the PLMN selection trigger based on the communication state of the UE.

That is, it is possible to control the trigger of network selection by the user equipment in a roaming environment.

(Apparatus Configuration)

Next, a functional configuration example of the network node 10 and the user equipment 20 that implement the above-described processes and operations, will be described. The network node 10 and the user equipment 20 include functions for implementing the above-described embodiments. However, each of the network node 10 and the user equipment 20 may have only some of the functions of the embodiments.

<Network Node 10>

Figure 10:
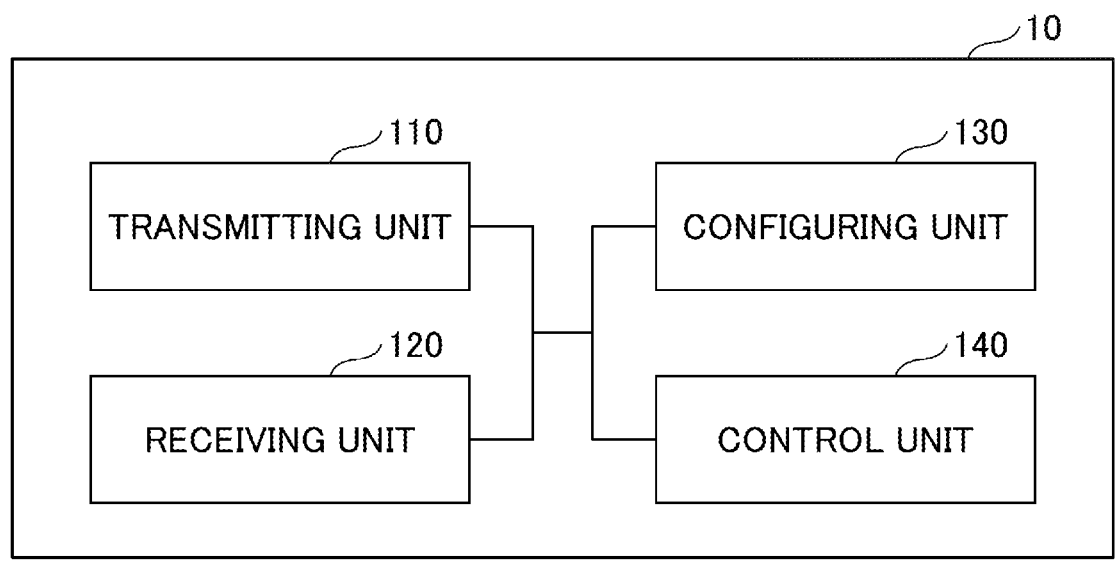
FIG. 10 is a diagram illustrating an example of a functional configuration of a network node 10 according to the embodiment of the present invention.

FIG. 10 is a diagram illustrating an example of a functional configuration of the network node 10. As illustrated in FIG. 10, the network node 10 includes a transmitting unit 110, a receiving unit 120, a configuring unit 130, and a control unit 140. The functional configuration illustrated in FIG. 10 is only an example. As long as the operations according to the embodiment of the present invention can be implemented, the functional division and the name of the functional unit may be any functional division and name. Furthermore, the network node 10 having a plurality of different functions on the system architecture may be configured by a plurality of the network nodes 10 separated for each function.

The transmitting unit 110 includes a function of generating signals to be transmitted to the user equipment 20 or another network node 10, and transmitting the signals in a wired or wireless manner. The receiving unit 120 includes a function of receiving various signals transmitted from the user equipment 20 or another network node 10, and acquiring, for example, information of a higher layer from the received signals.

The configuring unit 130 stores pre-configured configuration information and various kinds of configuration information to be transmitted to the user equipment 20, in a storage device, and reads these pieces of information from the storage device as necessary. The content of the configuration information is, for example, subscriber information of the user equipment 20 and SoR information.

As described in the embodiment, the control unit 140 performs processing related to communication control of the user equipment 20 in the roaming environment. Furthermore, the control unit 140 performs processing related to reporting of SoR information to the user equipment 20. A functional unit related to signal transmission in the control unit 140, may be included in the transmitting unit 110, and a functional unit related to signal reception in the control unit 140, may be included in the receiving unit 120.

<User Equipment 20>

Figure 11:
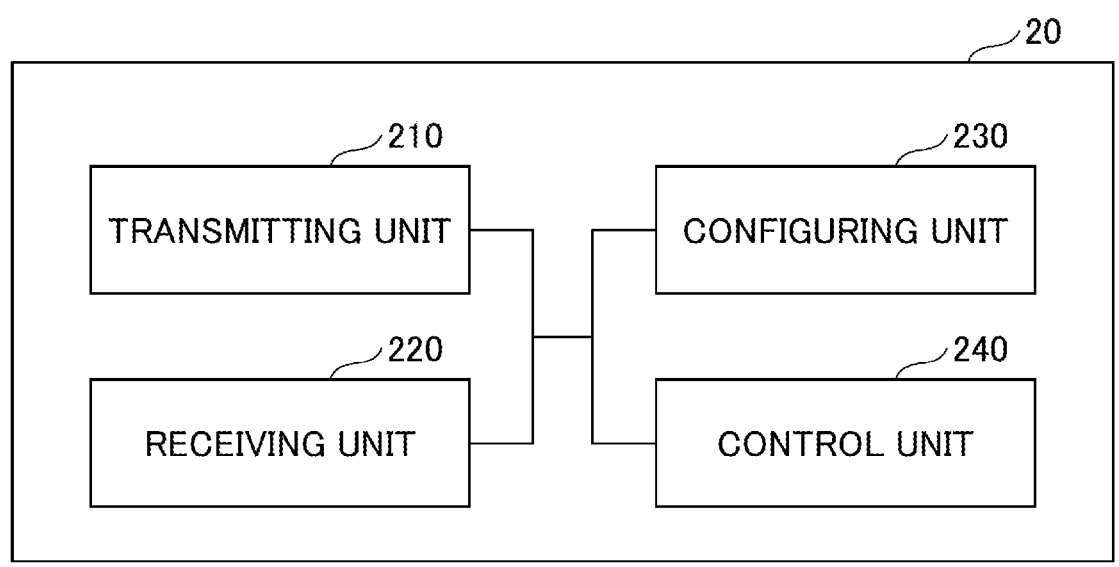
FIG. 11 is a diagram illustrating an example of a functional configuration of a user equipment 20 according to an embodiment of the present invention.

FIG. 11 is a diagram illustrating an example of a functional configuration of the user equipment 20. As illustrated in FIG. 11, the user equipment 20 includes a transmitting unit 210, a receiving unit 220, a configuring unit 230, and a control unit 240. The functional configuration illustrated in FIG. 11 is only an example. As long as the operations according to the embodiment of the present invention can be implemented, the functional division and the name of the functional unit may be any functional division and name.

The transmitting unit 210 creates transmission signals from the transmission data and wirelessly transmits the transmission signals. The receiving unit 220 wirelessly receives various kinds of signals and acquires signals of a higher layer from the received signals of the physical layer. Furthermore, the receiving unit 220 has a function of receiving the NR-PSS, the NR-SSS, the NR-PBCH, the DL/UL control signal, or the reference signal, etc., transmitted from the network node 10.

The configuring unit 230 stores various kinds of configuration information received from the network node 10 by the receiving unit 220, in a storage device, and reads these pieces of information from the storage device as necessary. Furthermore, the configuring unit 230 also stores pre-configured configuration information. The content of the configuration information is, for example, subscriber information and SoR information.

As described in the embodiments, the control unit 240 performs processing related to communication control in the roaming environment, based on the SoR information. Furthermore, the control unit 240 performs processing related to PLMN switching control at the time of receiving SoR information. A functional unit related to signal transmission in the control unit 240, may be included in the transmitting unit 210, and a functional unit related to signal reception in the control unit 240, may be included in the receiving unit 220.

(Hardware Configuration)

The block diagrams (FIGS. 10 and 11) used for describing the embodiment described above are of blocks of functional units. These functional blocks (constituent units) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented by combining software with the above one device or a plurality of devices.

The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, notifying, communicating, forwarding, configuring, reconfiguring, allocating, mapping, assigning, etc.; however, the functions are not limited as such. For example, a function block (constituent unit) that implements the transmission function is referred to as a transmitting unit or a transmitter. In any case, as described above, the implementation method is not particularly limited.

Figure 12:
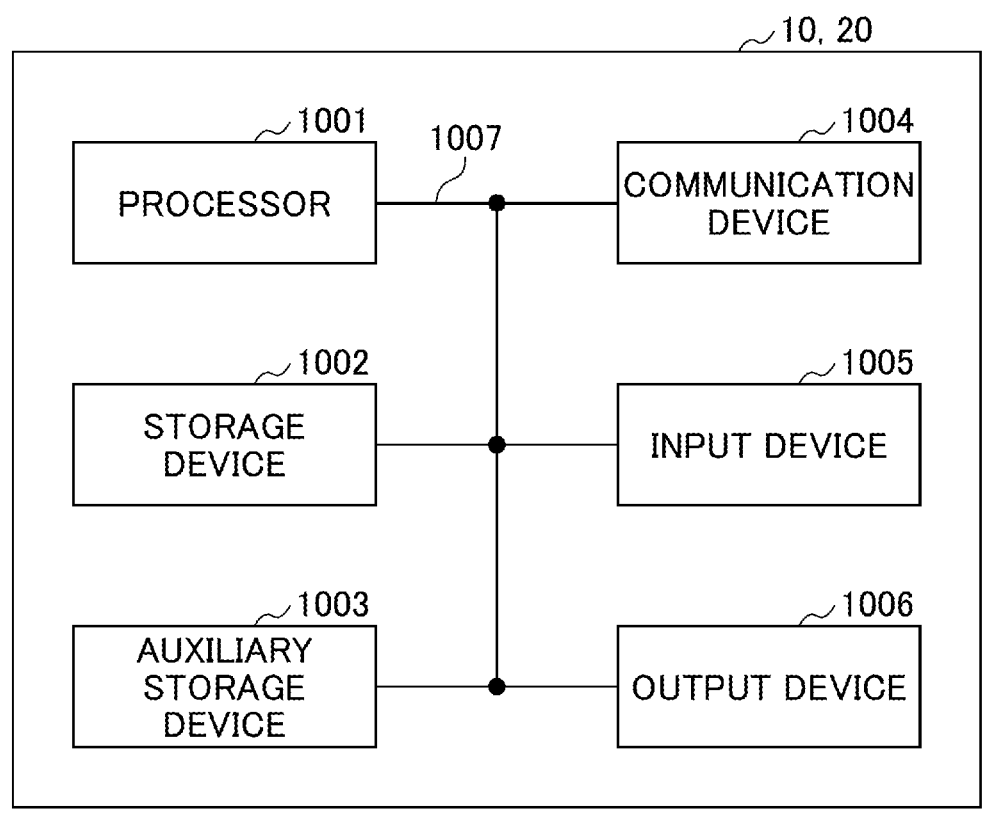
FIG. 12 is a diagram illustrating an example of a hardware configuration of the network node 10 or the user equipment 20 according to an embodiment of the present invention.

For example, the network node 10 and the user equipment 20, etc., according to the embodiment of the present disclosure may function as a computer that performs processes of the radio communication method according to the present disclosure. FIG. 12 is a diagram illustrating an example of a hardware configuration of the network node 10 and the user equipment 20 according to the embodiment of the present disclosure. The network node 10 and the user equipment 20 described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, a unit. The hardware configuration of the network node 10 and the user equipment 20 may be configured to include one or more devices illustrated in the figure, or may be configured to not include some of the devices.

The functions of the network node 10 and the user equipment 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register. For example, the above control unit 140 and the control unit 240, etc., may be implemented by the processor 1001.

Furthermore, the processor 1001 loads a program (program code), a software module, or data, etc., from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the control unit 140 of the network node 10 illustrated in FIG. 10 may be implemented by a control program stored in the storage device 1002 and operating on the processor 1001. Furthermore, the control unit 240 of the user equipment 20 illustrated in FIG. 11 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the communication method according to the embodiment of the present disclosure.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The above-described storage medium may be, for example, a database including at least one of the storage device 1002 and the auxiliary storage device 1003, a server, or another appropriate medium.

The communication device 1004 is hardware (transmission/reception device) for performing communication between computers via at least one of a wired network and a wireless network, and is also referred to as a network device, a network controller, a network card, and a communication module, etc., for example. The communication device 1004 may be configured by including a high-frequency switch, a duplexer, a filter, a frequency synthesizer, etc., in order to implement at least one of frequency division duplex (FDD) and time division duplex (TDD). For example, a transmission/reception antenna, an amplifier unit, a transmission/reception unit, and a transmission line interface, etc., may be implemented by the communication device 1004. In the transmission/reception unit, the transmission unit and the reception unit may be physically or logically separated from each other.

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Furthermore, the respective devices such as the processor 1001 and the storage device 1002 are connected by a bus 1007 for communicating information. The bus 1007 may be formed of a single bus or may be formed by using different buses between the devices.

Furthermore, the network node 10 and the user equipment 20 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

(Overview of Embodiment)

As described above, according to an embodiment of the present invention, a user equipment is provided, the user equipment including a receiving unit configured to receive, from a network node in a VPLMN (Visited Public land mobile network), information indicating a PLMN to be prioritized and information indicating a trigger of PLMN selection; and a control unit configured to execute the PLMN selection, based on the information indicating the PLMN to be prioritized and the information indicating the trigger of the PLMN selection.

With the above configuration, the AMF, which is a network node, can report, to the UE, the information on the PLMN selection trigger, and can control the trigger of PLMN selection by the UE. That is, it is possible to control the trigger of network selection by the user equipment in a roaming environment.

The control unit may execute the PLMN selection when a timer expires at a timer value, in a case where the information indicating the trigger of the PLMN selection includes the timer value, the timer being configured to start upon receiving the information indicating the PLMN to be prioritized and the information indicating the trigger of the PLMN selection, and the control unit may execute the PLMN selection while communication is being performed, based on a flag, in a case where the information indicating the trigger of the PLMN selection includes the flag. With this configuration, the user equipment 20 can control the PLMN selection trigger based on the timer value or the flag.

The information indicating the trigger of the PLMN selection includes the timer value or the flag associated with each call type, and the control unit may execute the PLMN selection based on the timer value or the flag associated with a call being communicated. With this configuration, the user equipment 20 can control the PLMN selection trigger based on the configuration of a timer or a flag according to the call type.

Furthermore, according to an embodiment of the present invention, a network node that is a first network node in a HPLMN (Home Public land mobile network) is provided, the network node including a receiving unit configured to receive information indicating a communication state of a user equipment, from a second network node in a VPLMN (Visited Public land mobile network); a control unit configured to determine information indicating a trigger of PLMN selection, based on the communication state of the user equipment; and a transmitting unit configured to transmit, to the second network node, information indicating a PLMN to be prioritized and the information indicating the trigger of the PLMN selection.

With the above configuration, AMF can report, to the UDM that is a network node, the communication state of the UE, so that the UDM can determine an appropriate PLMN selection trigger. That is, it is possible to control the network selection trigger of the user equipment in a roaming environment.

Furthermore, according to an embodiment of the present invention, a network node in a VPLMN (Visited Public land mobile network) is provided, the network node including a receiving unit configured to receive information indicating a communication state of a user equipment; a control unit configured to determine information indicating a trigger of PLMN selection, based on the communication state of the user equipment; and a transmitting unit configured to transmit, to the user equipment, information indicating a PLMN to be prioritized and the information indicating the trigger of the PLMN selection.

With the above configuration, the AMF can determine the PLMN selection trigger based on the communication state of the UE. That is, it is possible to control the network selection trigger of the user equipment in a roaming environment.

Furthermore, according to an embodiment of the present invention, a communication system is provided, the communication system including a first network node in a HPLMN (Home Public land mobile network); a second network node in a VPLMN (Visited Public land mobile network); and a user equipment, wherein the first network node includes a transmitting unit configured to transmit, to the second network node, information indicating a PLMN to be prioritized and information indicating a trigger of PLMN selection, the second network node includes a receiving unit configured to receive, from the first network node, the information indicating the PLMN to be prioritized and the information indicating the trigger of the PLMN selection, and a transmitting unit configured to transmit, to the user equipment, the information indicating the PLMN to be prioritized and the information indicating the trigger of the PLMN selection, and the user equipment includes a receiving unit configured to receive, from the second network node, the information indicating the PLMN to be prioritized and the information indicating the trigger of the PLMN selection, and a control unit configured to execute the PLMN selection, based on the information indicating the PLMN to be prioritized and the information indicating the trigger of the PLMN selection.

With the above configuration, the communication system can report, to the UE, information on the PLMN selection trigger, and can control the PLMN selection trigger of the UE. That is, it is possible to control the trigger of network selection by the user equipment in a roaming environment.

(Supplement of Embodiment)

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the network node 10 and the user equipment 20 are described by using the functional block diagrams; however, such devices may be implemented in hardware, software, or combinations thereof. The software to be executed by the processor included in the network node 10 in accordance with the embodiment of the present invention and the software to be executed by the processor included in the user equipment 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be given by using any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, etc.

Each aspect and embodiment described in this disclosure is applicable to at least one of LTE, LTE-A, SUPER 3G, IMT-Advanced, 4G (4th generation mobile communication system), 5G (5th generation mobile communication system), NR(new Radio), future radio access (FRA), NR (New Radio), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded on the basis of the systems. Furthermore, each aspect and embodiment described in this disclosure may be applied to a combination of a plurality of systems (for example, a combination of at least one of LTE and LTE-A, and 5G, etc.)

The processing procedures, the sequences, the flowcharts, etc., of the respective aspects/embodiments described in this specification may be reversed in order unless there is a contradiction. For example, the method described in this disclosure presents elements of various steps in an exemplary order and is not limited to a presented specific order.

In the present specification, a specific action that is supposed to be performed by the network node 10 may be performed by an upper node in some cases. In the network configured with one or a plurality of network nodes including the network node 10, various actions performed for communication with the user equipment 20 can be obviously performed by at least one of the network node 10 and any network node (for example, an MME or an S-GW, etc., is considered, but it is not limited thereto) other than the network node 10. The example in which the number of network nodes excluding the network node 10 is one has been described above, but the other network nodes may be a combination of a plurality of other network nodes (for example, an MME and an S-GW).

Information or signals, etc., described in the present disclosure can be output from the higher layer (or the lower layer) to the lower layer (or the higher layer). Information, etc., may be input/output via a plurality of network nodes.

Input and output information, etc., may be stored in a specific place (for example, a memory) or may be managed by using a management table. Input and output information, etc., may be overwritten, updated, or additionally written. Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, etc., regardless of whether software is called software, firmware, middleware, a microcode, a hardware description language, or any other name.

Further, software, commands, information, etc., may be transmitted and received via a transmission medium. For example, when software is transmitted from a web site, a server, or any other remote source using at least one of a wired technology (a coaxial cable, a fiber optic cable, a twisted pair, or a digital subscriber line (DSL), etc.) and a wireless technology (infrared rays or a microwave, etc.), at least one of the wired technology and the wireless technology is included in a definition of a transmission medium.

Information, signals, etc., described in the present disclosure may be indicated using any one of a variety of different techniques. For example, data, instructions, commands, information, signals, bits, symbols, chips, etc., which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling). Further, a signal may be a message. Further, a component carrier (CC) may be referred to as a "carrier frequency," a "cell," or a "frequency carrier", etc.

The terms "system" and "network" used in the present disclosure are used interchangeably.

Further, information, parameters, etc., described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas, etc., using the parameters may be different from those explicitly disclosed in the present disclosure. Since various channels (for example, the PUCCH, the PDCCH, etc.) and information elements, etc., can be identified by suitable names, the various names allocated to the various channels and the information elements are not limited in any respect.

In the present disclosure, the terms "base station," "radio base station," "base station apparatus," "fixed station," "Node B," "eNodeB (eNB)," "gNodeB (gNB)," "access point," "transmission point," "reception point," "transmission/reception point," "cell," "sector," "sector group," "carrier," "component carrier" can be used interchangeably. The base station is also referred to as a macro cell, a small cell, a Femto cell, a pico cell, etc.

The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "MS: Mobile Station", "user terminal", "UE: User Equipment", and "terminal", etc., can be used interchangeably.

The mobile station UE is also referred to as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication device, etc. Note that at least one of the base station and the mobile station may be a device mounted on a mobile body, the mobile body itself, etc. The mobile body may be a vehicle (for example, a car, an airplane, etc.), a mobile body that moves unmanned (for example, a drone, an automatically driven vehicle, etc.), or a robot (manned type or unmanned type). Note that at least one of the base station and the mobile station also includes a device which does not necessarily move during the communication operation. For example, at least one of the base station and the mobile station may be an IoT (Internet of Things) device such as a sensor.

Furthermore, the base station in the present disclosure may be read as a user terminal. For example, the communication between the base station and the user terminal is replaced with communication (for example, may be referred to as D2D (Device-to-Device), V2X (Vehicle-to-Everything)) between a plurality of user equipments 20, and each aspect/embodiment of the present disclosure may be applied to the configuration after replacement. In this case, the user equipment 20 may have the functions of the network node 10 described above. Furthermore, terms such as "uplink" and "downlink" may also be read as terms corresponding to inter-terminal communication (for example, "side"). For example, uplink channels, downlink channels, etc., may be read as side channels.

Similarly, the user terminal in the present disclosure may be read as a base station. In this case, the base station may include the functions of the above-described user terminal. In some cases, the terms "determining" and "deciding" used in the disclosure include various operations. The terms "determining" and "deciding" can include, for example, "determination" and "decision" for judging, calculating, computing, processing, deriving, investigating, looking-up, or search inquiry (for example, looking-up in a table, a database, or other data structures), and ascertaining operations. In addition, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation. Furthermore, "determining (deciding)" may be read as "assuming", "expecting", and "considering".

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. For example, "connect" may be read as "access". In the disclosure, it can be considered that two elements are "connected" or "coupled" to each other by using one or more electric wires, at least one of a cable and a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

In the present disclosure, the term "on the basis of" used in the specification does not mean "on the basis of only" unless otherwise stated. In other words, the term "on the basis of" means both "on the basis of only" and "on the basis of at least".

In the present disclosure, any reference to elements with the names "first" and "second" used in the specification does not generally limit the number of elements or the order of the elements. These names can be used as a convenient method for distinguishing two or more elements in the disclosure. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

In the present disclosure, when "include," "including," and modifications thereof are used, these terms are intended to be inclusive, similarly to the term "comprising". In addition, the term "or" used in the present disclosure does not mean exclusive OR.

In the present disclosure, if an article is added by translation, such as a, an, the, etc., in English, the present disclosure may include a case where the noun following the article is plural.

In the present disclosure, the term "A and B are different" may mean "A and B are different from each other". Note that this term may mean "A and B are each different from C". Terms such as "separated", "coupled", etc., may also be interpreted in the same manner as "different".

Each aspect/embodiment described in the present disclosure may be used singly or in combination, or may be used by being switched in accordance with the execution. Furthermore, reporting of predetermined information (for example, reporting "being X") is not limited to being reporting explicitly; this may be done implicitly (for example, not reporting the predetermined information).

Note that the AMF in the present disclosure is an example of a network node or a second network node in VPLMN. UDM is an example of a first network node.

Although the present disclosure has been described in detail, it is apparent to those skilled in the art that the present disclosure is not limited to the embodiments as described in the present disclosure. The present disclosure can be implemented as modifications and variations without departing from the sprit and scope of the present disclosure as defined in claims. Thus, the description in the present disclosure is intended for exemplary description and does not mean any restriction to the present disclosure.

This international patent application is based on and claims priority to European Patent Application No. 19315001.8 filed on Jan. 9, 2019, and the entire content of European Patent Application No. 19315001.8 is incorporated herein by reference.

LIST OF REFERENCE SYMBOLS 10 network node
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
a receiver configured to receive, from a network node in a (Visited Public land mobile network (VPLMN), information indicating a PLMN to be prioritized and information indicating a trigger of PLMN selection; and
a processor configured to execute the PLMN selection, based on the information indicating the trigger of the PLMN selection,
wherein the information indicating the trigger of the PLMN selection includes a value for a timer, the timer being associated with each type of a call, and
wherein, upon receiving the information indicating the trigger of the PLMN selection, the processor is configured to start the timer associated with a type of a call, the call being executed, and the processor is configured to execute the PLMN selection when the timer expires.

2. The terminal according to claim 1, wherein
the processor is configured to execute the PLMN selection based on the information indicating the PLMN to be prioritized and the information indicating the trigger of the PLMN selection.

3. The terminal according to claim 1, wherein the type of the call is defined for Data Network Name (DNN).

4. The terminal according to claim 1, wherein the type of the call is a Short Message Service (SMS).

5. A communication method performed by a terminal, the method comprising:
receiving, from a network node in a Visited Public land mobile network (VPLMN), information indicating a PLMN to be prioritized and information indicating a trigger of PLMN selection;
executing the PLMN selection, based on the information indicating the trigger of the PLMN selection,
wherein the information indicating the trigger of the PLMN selection includes a value for a timer, the timer being associated with each type of a call;
upon receiving the information indicating the trigger of the PLMN selection, starting the timer associated with a type of a call, the call being executed; and
executing the PLMN selection when the timer expires.

* * * * *